US007995050B2

(12) United States Patent
Wong et al.

(10) Patent No.: US 7,995,050 B2
(45) Date of Patent: Aug. 9, 2011

(54) POWER SAVING DISPLAY

(75) Inventors: Yoon Kean Wong, Redwood City, CA (US); James Samuel Bowen, Santa Clara, CA (US); Chun Wun Yeung, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 11/646,181

(22) Filed: Dec. 27, 2006

(65) Prior Publication Data

US 2008/0158117 A1 Jul. 3, 2008

(51) Int. Cl.
*G06F 3/38* (2006.01)
*G09G 5/00* (2006.01)

(52) U.S. Cl. ........................................ 345/211; 345/204

(58) Field of Classification Search .................... 345/87, 345/88, 89, 94, 204, 211, 212; 455/566
See application file for complete search history.

(56) References Cited

U.S. PATENT DOCUMENTS

| | | | |
|---|---|---|---|
| 5,119,498 A | 6/1992 | McNeill et al. | |
| 5,335,322 A | 8/1994 | Mattison | |
| 5,473,342 A | 12/1995 | Tse et al. | |
| 5,500,654 A | 3/1996 | Fujimoto | |
| 5,568,536 A | 10/1996 | Tiller et al. | |
| 5,659,715 A | 8/1997 | Wu et al. | |
| 5,696,531 A | 12/1997 | Suzuki et al. | |
| 5,712,664 A | 1/1998 | Reddy | |
| 5,727,202 A | 3/1998 | Kucala | |
| 5,767,834 A | 6/1998 | Vouri et al. | |
| 5,790,138 A | 8/1998 | Hsu | |
| 5,793,385 A | 8/1998 | Nale | |
| 5,844,545 A | 12/1998 | Suzuki et al. | |
| 5,854,638 A | 12/1998 | Tung | |
| 5,860,016 A | 1/1999 | Nookala | |
| 5,900,886 A | 5/1999 | Shay | |
| 5,915,265 A | 6/1999 | Crocker et al. | |
| 5,920,177 A | 7/1999 | Davis | |
| 5,943,064 A | 8/1999 | Hong | |
| 5,961,617 A | 10/1999 | Tsang | |
| 5,977,995 A | 11/1999 | Yassaie | |
| 6,006,303 A | 12/1999 | Barnaby et al. | |
| 6,057,862 A | 5/2000 | Margulis | |
| 6,075,523 A | 6/2000 | Simmers | |
| 6,106,468 A | 8/2000 | Dowdell | |
| 6,108,014 A | 8/2000 | Dye | |
| 6,126,601 A | 10/2000 | Gilling | |
| 6,137,466 A * | 10/2000 | Moughanni et al. | 345/99 |

(Continued)

OTHER PUBLICATIONS

National Semiconductor, Advance Information, FPD94128 528-Ch Small Format a-Si AMLCD Controller / Column Driver with Integrated Frame Buffer, May 2003, 4 pgs.

(Continued)

*Primary Examiner* — Ricardo L Osorio

(74) *Attorney, Agent, or Firm* — Mahamedi Paradice Kreisman LLP; Van Mahamedi

(57) ABSTRACT

A mobile computing device comprises a power source, a display, a display driver and a control circuit. The power source is configured to provide a power signal. The display comprises a plurality of pixels. The display driver is configured to receive the power signal and to drive the pixels based on the power signal and display data. The control circuit is configured to periodically remove the power signal from at least a portion of the display driver.

24 Claims, 5 Drawing Sheets

U.S. PATENT DOCUMENTS

| | | | | |
|---|---|---|---|---|
| 6,137,481 | A | 10/2000 | Phillipps | |
| 6,463,445 | B1 | 10/2002 | Suzuki et al. | |
| 6,522,347 | B1 | 2/2003 | Tsuji et al. | |
| 6,665,224 | B1 | 12/2003 | Lehmann et al. | |
| 6,750,850 | B2 | 6/2004 | O'Leary | |
| 7,027,056 | B2 * | 4/2006 | Koselj et al. | 345/519 |
| 7,048,401 | B2 | 5/2006 | Lee et al. | |
| 7,281,066 | B2 * | 10/2007 | Rader et al. | 710/51 |
| 7,389,432 | B2 * | 6/2008 | Chandley et al. | 713/320 |
| 7,474,288 | B2 * | 1/2009 | Smith et al. | 345/83 |
| 2002/0063716 | A1 | 5/2002 | Osborn et al. | |
| 2003/0030633 | A1 | 2/2003 | Chou et al. | |
| 2003/0164904 | A1 | 9/2003 | Grohn et al. | |
| 2008/0062182 | A1 | 3/2008 | Osborn et al. | |

OTHER PUBLICATIONS

Board of Patent Appeals and Interferences for U.S. Appl. No. 09/726,831, Decision on Appeal, Appeal 2007-1572, Technology Center 2600, date decided Sep. 27, 2007, 13 pages.

Preliminary Amendment for U.S. Appl. No. 11/891,320, date mailed Aug. 9, 2007, 27 pages.

Request for Continued Examination (RCE) Transmittal and Amendment for U.S. Application No. 09/726,831, date mailed Oct. 30, 2007, 10 pages.

National Semiconductor, FPD95220—320-Channel LTPS Dot Inversion Driver with Programmable Partial Display, printed from Internet address: http://www.national.com/pf/FP/FPD95220.html, on Oct. 30, 2007, 4 pages.

NEC Electronics, NEC Develops World's Fastest 64M-bit Low Power Memory Specified for Mobile Applications, printed from Internet address: http://www.necel.com/english/news/0201/2201.html, on Oct. 30, 2007, 3 pages.

FPD95220—320-Channel LTPS Dot Inversion Driver with Programmable Partial Display, printed from Internet address: http://www.national.com/pf/FP/FPD95220.html on Oct. 30, 2007, 4 pages.

NEC Develops World's Fastest 64M-bit Low Power Memory Specified for Mobile Applications, printed from Internet address: http://www.necel.com/english/news/0201/2201.html on Oct. 30, 2007, 3 pages.

* cited by examiner

POWER SAVING DISPLAY

BACKGROUND

Low power consumption is a design goal for many electronic devices. This is particularly true for mobile computing devices, and those using color displays. Improvements in display technology have provided bright, colorful displays with many more capabilities than previous displays. Along with the improved display technology, however, has come increased power consumption.

Some display drivers provide a partial display or partial refresh feature. In one example of such a feature, a display driver may switch from providing full display data to a liquid crystal display (LCD) to providing partial display data to the LCD from a dedicated memory. This may allow the display driver to enter a lower power mode and further allow a microprocessor or application-specific integrated circuit providing the display data to the display driver to enter a low power or sleep mode. However, further reductions in power consumption are needed.

Accordingly, what is needed is an improved system and method for reducing power consumption in a display system. Further what is needed is a mobile computing device which has a longer operating time on a single battery charge than in previous devices. Further still what is needed is a system and method for further reducing power consumption in a partial display mode or in a full display mode. Further still, what is needed is a system and method for providing other advantageous features associated with periodically removing a power supply signal from a liquid crystal display.

The teachings herein extend to those embodiments which fall within the scope of the appended claims, regardless of whether they accomplish one or more of the above-mentioned needs.

DETAILED DESCRIPTION OF THE EXEMPLARY EMBODIMENTS

Figure 1:
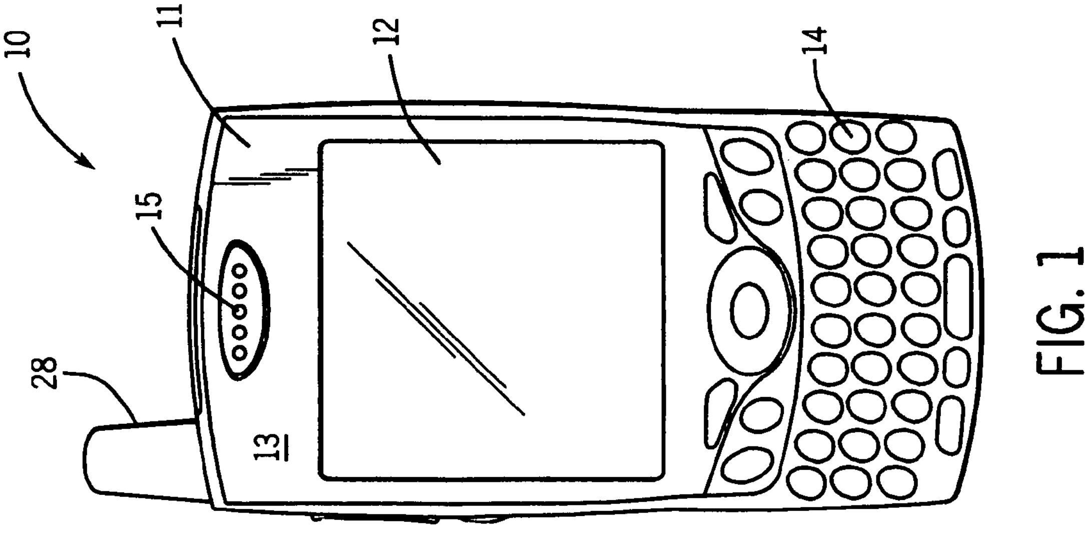
FIG. 1 is a front view of a mobile computing device, according to an exemplary embodiment.

Referring first to FIG. 1, a mobile computing device 10 is shown. Device 10 is a smart phone, which is a combination mobile telephone and handheld computer having personal digital assistant functionality. The teachings herein can be applied to other mobile computing devices (e.g., a laptop computer, MP3 player, watch, portable gaming system) or other electronic devices (e.g., a desktop personal computer, home or car audio system, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 10 is further configured to receive and operate additional applications provided to device 10 after manufacture, e.g., via wired or wireless download, SecureDigital card, etc.

Figure 2:
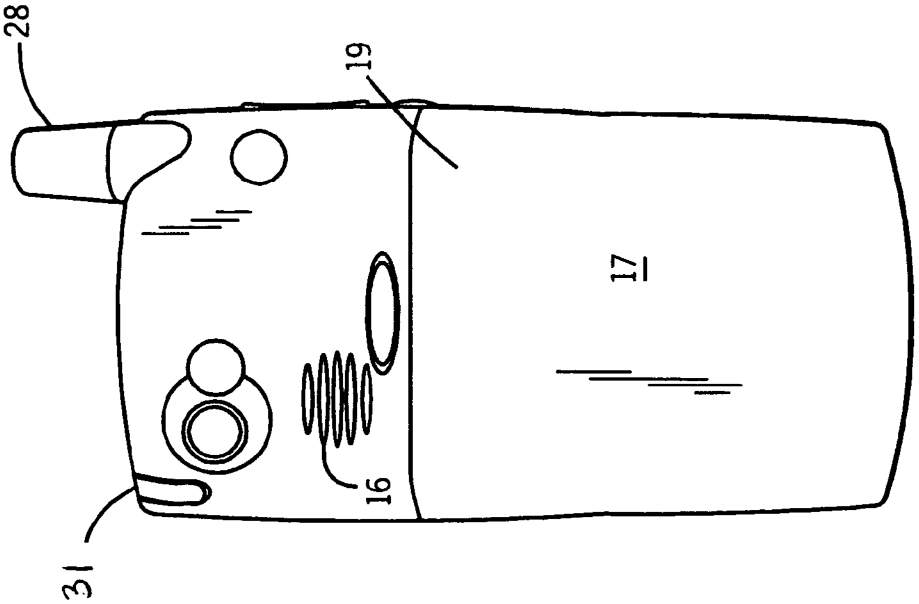
FIG. 2 is a back view of a mobile computing device, according to an exemplary embodiment.

Device 10 comprises a display 12 (which may be a plurality of displays of different types and sizes) and a user input device 14 (e.g., a QWERTY keyboard, buttons, touch screen, speech recognition engine, etc.). Device 10 also comprises an earpiece speaker 15. Earpiece speaker 15 may be a speaker configured to provide audio output with a volume suitable for a user placing earpiece 15 against or near the ear. Earpiece 15 may be positioned above display 12 or in another location on device 10. Device 10 comprises a housing 11 having a front side 13 and a back side 17 (FIG. 2). Earpiece 15 may be positioned on the front side 13 along with display 12 and user input device 14, and a loudspeaker 16 may be positioned on the back side along with a battery compartment 19. In alternative embodiments, display 12, user input device 14, earpiece 15 and loudspeaker 16 may each be positioned anywhere on front side 13, back side 17 or the edges therebetween.

Figure 3:
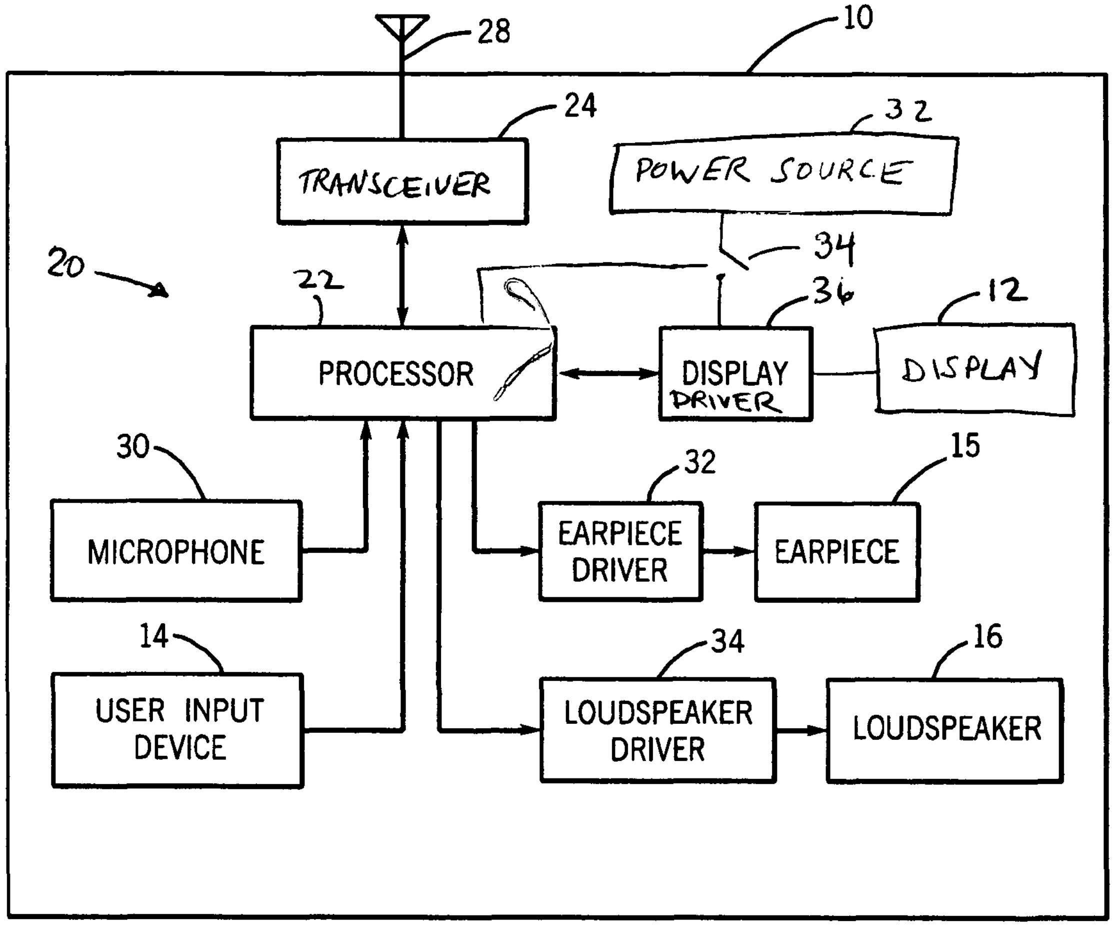
FIG. 3 is a block diagram of the mobile computing device of FIGS. 1 and 2, according to an exemplary embodiment.

Referring now to FIG. 3, device 10 comprises a processing circuit 20 comprising a processor 22. Processing circuit 20 can comprise one or more microprocessors, microcontrollers, and other analog and/or digital circuit components configured to perform the functions described herein. Processing circuit 20 comprises one or more memories (e.g., random access memory, read only memory, flash, etc.) configured to store software applications provided during manufacture or subsequent to manufacture by the user or by a distributor of device 10. In one embodiment, processing circuit 20 can comprise a first, applications microprocessor configured to run a variety of personal information management applications, such as calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a transceiver 24 which comprises analog and/or digital electrical components configured to receive and transmit wireless signals via antenna 28 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 30 configured to receive audio signals, such as voice signals, from a user or other person in the vicinity of device 10, typically by way of spoken words. Microphone 30 is configured as an electro-acoustic sense element to provide audio signals from the vicinity of device 10 and to convert them to an electrical signal to provide to processor 22. Processor 22 can provide a digital memo recorder function, wireless telephone function, etc. with words spoken into microphone 30. Processor 22 may also provide speech recognition and/or voice control of features operable on device 10. Display 12 can comprise a touch screen display in order to provide user input to processor 22 to control functions, such as to dial a telephone number, enable/disable speakerphone audio, provide user inputs regarding increasing or decreasing the volume of audio provided through earpiece 15 and/or loudspeaker 16, etc. Alternatively or in addition, user input device 14 can provide similar inputs as those of touch screen display 12. Device 10 can further comprise a stylus 31 to assist the user in making selections on display 12. Processor 22 can further be configured to provide video conferencing capabilities by displaying on display 12 video from a remote participant to a video conference, by providing a video camera on device 12 for providing images to the remote participant, by providing text messaging, two-way audio streaming in full- and/or half-duplex mode, etc.

Referring again to FIG. 3, a power source 32 is provided to power the electronic components of device 10. Power source 32 comprises circuitry to receive power from a battery and/or external power source and to provide various voltage, current, power regulation, and other power conditioning features for one or more power supply signals as required by the various electronic components of device 10. Device 10 further comprises a switch 34 configured to selectively remove power to at least a portion of a display driver 36, as will be described in more detail below. As illustrated, switch 34 is controlled by processor 22 in this exemplary embodiment.

Figure 4:
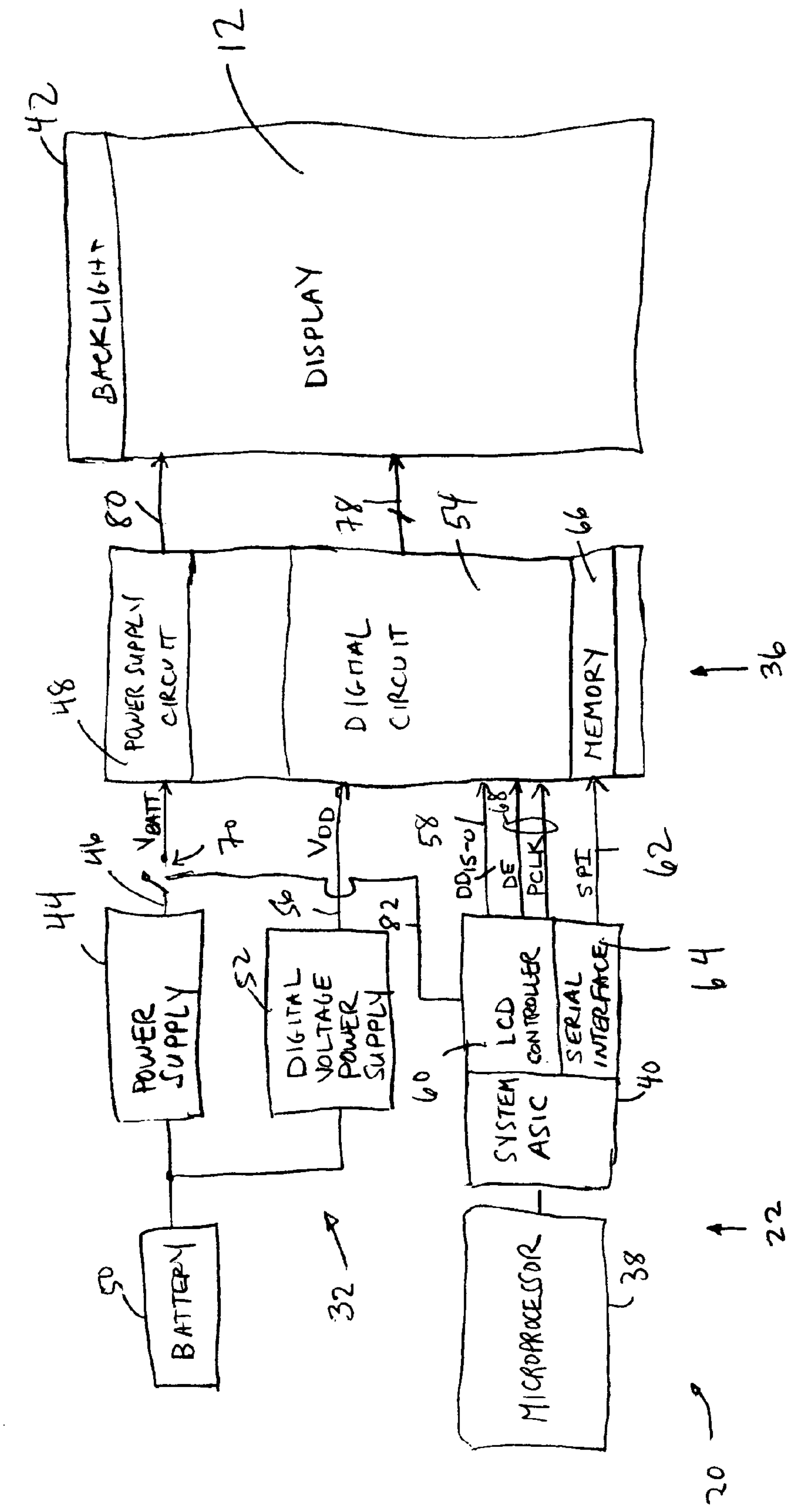
FIG. 4 is a block diagram of the mobile computing device according to another exemplary embodiment.

Referring now to FIG. 4, processing circuit 20 comprises a processor 22 which can include a microprocessor or microcontroller 38 and an application-specific integrated circuit (ASIC) 40 in this exemplary embodiment, though in alternative embodiments other types or combinations of processing or control circuitry may be used. Display 12 is a liquid crystal display, which may be an active matrix or passive matrix display, and may be a twisted nematic display, a 3LCD display, an in-plane switching (IPS) display, a thin-film transistor (TFT) display, etc. A liquid crystal display (LCD) comprises a plurality of crystals, each pixel comprising a layer of crystal molecules aligned between two transparent electrodes and two polarizing filters, the axis of polarity of which are perpendicular to each other. By applying an electric field, the orientation of liquid crystal molecules changes to selectively allow or disallow the light to pass through the display from a backlight 42 or reflective light source or other light source. When a voltage or power is removed from the electrodes, a period of time is required for the liquid crystals to align to a non-transmissive or no-display state. The liquid crystal states will be sustained by residual voltages across each liquid crystal cell during this time, thereby providing a “residual image.” While this effect occurs in liquid crystal displays, a similar effect may be found in other displays, and one or more of the embodiments shown herein may be applied to electronic paper, organic light-emitting diodes (OLEDs), cathode ray tube (CRT), electroluminescent (EL) displays or other displays that have persistence, such as displays that use phosphorus materials and electroluminescence.

Referring again to FIG. 4, mobile computing device 10 comprises a power source 32 configured to provide a power signal 46 via a power supply 44 to a power supply circuit 48 of display driver 36. A battery 50 (e.g., a lithium-ion battery or other battery type) provides power to power supply 44 which provides a suitable power supply signal to power supply circuit 48. In one example, power supply 44 is simply a wire providing power from power source 32 to display driver 36. Power source 32 further comprises a digital voltage power supply 52 configured to provide a digital voltage power supply signal with a voltage suitable for digital electronics (e.g., 1.8 volts, 3.3 volts, 5 volts, etc.) to a digital circuit portion 54 of display driver 36.

Display driver 36 is configured to receive power signal 46 and to drive pixels on display 12 based on the power signal and based on display data received via a display data signal 58 from system ASIC 40 and, more particularly, a display controller portion 60 (e.g., LCD controller) of system ASIC 40. Display driver 36 is further configured to receive serial display data via a serial display data signal 62 from a serial interface portion 64 of system ASIC 40 for storage in a display driver memory 66, for example, for a partial display or partial refresh mode as will be described below. Suitable clock and enable signals 68 are also provided from display controller 60 to digital circuit portion 54. Other data, control, and power signals may be provided between processing circuit 20 and display driver 36 according to various alternative embodiments. In this exemplary embodiment, display driver 36 may be an FPD95120, FPD95220 or FPD93140 display driver manufactured by National Semiconductor Corporation, but may be other display drivers.

As mentioned, display driver 36 is configured to receive power signal 46 and to drive pixels on display 12 via their corresponding electrodes based on power supply signal 46 and based on display data 58, 62 received from system ASIC 40 or replayed from memory 66. Processing circuit 20 is further configured to use a switch 70 or other mechanism (e.g., a high side switch, a field-effect transistor, such as a P-channel metal-oxide-semiconductor field-effect transistor (MOSFET) designed for high side switching, etc.) to periodically remove power signal 46 (or in an alternative embodiment power signal 32) from at least a portion of display driver 36, in this embodiment power supply circuit 48. Switch 70 may have a rating over the max Vbatt, such as 4.2 Volts and a low $R_{ds}$(on). In an alternative embodiment, switch 70 is placed between battery 50 and power supply 44. Removing power signal 46 to disable power supply 44 from a portion of display driver 36 also disables the voltage required to turn on or refresh a display pixel of display 12. Residual voltages across the pixels will maintain an image being displayed on display 12 for a period of time. By removing power from power supply circuit 48, power consumption may be reduced. The persistence of the liquid crystals may be utilized to allow powering down subsystems of display driver 36 (and not refreshing display 12 regularly) while maintaining a consistent image on display 12. Power signals 46 or 32 may be removed, cycled, pulsed, attenuated, reduced, disconnected, or decreased.

According to one exemplary embodiment, display 12 and display driver 36 require a plurality of power signals, one regulated for digital power, such as the digital voltage power supply signal and one which may be unregulated (e.g., Vbatt, such as power signal 46) that display driver 36 may use to generate various display driving voltages (which may include +5V, −5V, etc., depending on the display technology and specifications of display driver 36). In this exemplary embodiment, Vbatt, which is the source of display driving voltages, may be removed while maintaining the supply of digital voltage power supply signal to display driver 36. As a result, display driver 36 may continue to function, but it does not have the driving voltage or voltages needed to actively switch on the pixels as it would have in a normal operating mode. By removing Vbatt, in this exemplary embodiment, a high power consuming portion or perhaps the most power consuming portion of display driver 36 will no longer be consuming power because the power supply signal to that portion has been removed.

A regular or normal refresh rate of display 12 may be fixed or variable according to software and/or ASIC programming and may, in an exemplary embodiment, provide a display refresh rate of between 50 and 70 Hertz (Hz). The periodic removal or cycling of power signal 46 may be provided with a variety of frequencies and/or duty cycles. In an exemplary embodiment, power may be removed or the display may be refreshed with a frequency of approximately 0.005 to 10 Hz (corresponding to a period of between approximately greater than 0.1 seconds and/or less than approximately 200 seconds between power cycling). According to another exemplary embodiment, processing circuit 20 is configured to remove the power signal with a period of less than approximately 20 seconds. The removal of power may happen automatically, without user interaction.

Further, the removal or cycling of power signal 46 can happen with a rate or frequency or duty cycle which is dynamically adjusted. For example, at least one of a duty cycle and frequency can be adjusted or set based on a criteria, such as a temperature (e.g. an ambient temperature). The settling time of crystals may vary based on temperature, and power savings can be optimized by providing a dynamic control based on this criteria. The removal of power signal 46 can further be dynamically adjusted based on whether display driver 36 is operating in a normal display mode or a partial display mode, as will be described below. The removal of power signal 46 can further be dynamically varied based on the type of display data being provided on display. For example, in a situation when backlight 42 is on and display 12 is displaying a static image such as a calendar, a black and white e-mail, etc., power signal 46 can be cycled to provide power savings. Thus, processing circuit 20 can be configured to cycle or remove power from power supply circuit 48 or another portion of display driver 36 in varying frequencies and duty cycles during a plurality of different modes of operations and/or based on display data, temperature, and/or other criteria.

According to one exemplary embodiment, power can be saved in situations when display data updates less frequently than a normal or regular display mode. Power can be reduced or removed from one or more portions of display driver 36 and/or display 12. In one embodiment, power signal 46 is removed or reduced. In another embodiment, digital voltage power signal 56 may also be removed or reduced, along with or independent of power signal 46. Further, signals provided to display 12 from display driver 36 may also be reduced or removed. A persistence effect of the liquid crystals within display 12 can be used to increase the period of activating or refreshing the portions of display driver 36 with little or no user-perceptable effect.

According to one exemplary embodiment, display driver 36 is operable in a first display mode (e.g., a normal or regular display mode having a conventional refresh rate of between 50 and 70 Hz or other refresh rate) and a second display mode (e.g., a partial display mode). In the second display mode, display driver 36 is configured to refresh display 12 with substantially less display data than in the first display mode. For example, partially refreshing display 12 may comprise reducing a refresh rate, a display size, and/or switching from color to black and white, monochrome or grayscale or a reduced bit-depth color mode. According to one embodiment, memory 26 is a buffer (e.g., static random access memory (SRAM) or dynamic random access memory (DRAM)) on driver 36 which can allow refresh of a portion of display data without requiring system ASIC 40 and display controller 60 to continuously transmit display data to driver 36. According to one example, a full screen or normal image may be provided on display 12 with 320 by RGB (red, green, blue) by 320 pixels with 16 bits per pixel (bpp), but in a second display mode, memory 66 provides 320 by RGB by 80 pixels at 3 bpp. In one embodiment, in a partial display mode, every pixel on the screen or on display 12 is refreshed, wherein pixels not having display data stored in memory 66 may be refreshed with blank, default or no data. Partial refresh may occur at 30-45 Hz refresh rate or other rates.

The second display mode may also comprise at least one of microprocessor 38, system ASIC 40, and display driver 36 or portions thereof, entering a low power mode (e.g., a mode in which power consumption is lower than another, typically normal operating mode). According to another embodiment, a second display mode may comprise a mode in which processing circuit 20 is configured to dim or turn off backlight 42, wherein the partial display data displayed on display 12 is illuminated by reflected light or another low power light source. According to one exemplary embodiment, in second display mode, display 12 is configured to show the time of day, battery charge status, date, wireless signal strength, wireless communication type, whether a message has been received in an inbox, etc.

Second display mode can comprise a partial display mode in which the entire display is used (e.g., an image is provided on substantially all of the screen) but only a black and white image is shown or the image is refreshed at a lower rate than a normal refresh mode.

Figure 5:
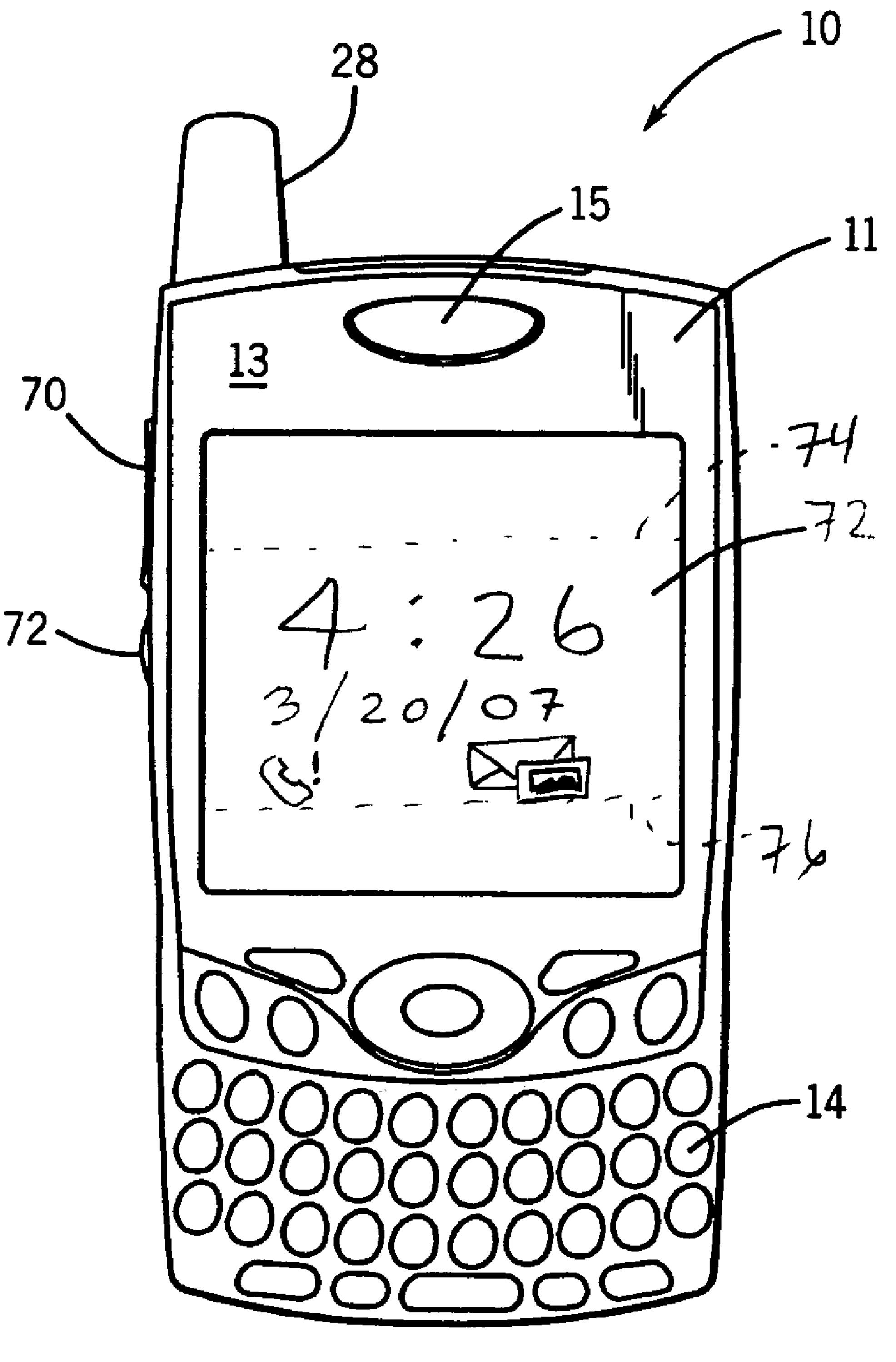
FIG. 5 is a front view of the mobile computing device of FIGS. 1 and 2 in a partial display or partial refresh mode, according to an exemplary embodiment.

Referring to FIG. 5, device 10 is shown with an exemplary image 72 in a partial display or partial refresh mode. Although not necessarily apparent to a user, only the display portion between lines 74 and 76 is refreshed with data from memory 66. In the second display mode, the icons and other display data shown may be refreshed at a lower refresh rate than a typical 50-70 Hz refresh rate. In this exemplary embodiment, a second display mode is provided when device 10 is powered off, for example by a user pressing an off switch or by a predetermined timeout timer operated by processing circuit 20.

According to one embodiment, in a first display mode, system ASIC 40 is configured to provide data via display data signal 58 (e.g., a parallel bus, comprising 16 bits, though serial or other buses may be used) to display driver 36. Digital circuit 54 is configured to provide the display data via control lines 78 to display 12 in this first mode. System ASIC 40 provides a timing signal to shift display data into driver 36 which latches the data to display 12, for example line after line. First display mode may provide a full 16-bit, high-contrast, display and/or other display characteristics associated with a typical normal display mode. In second display mode, memory 66 can be configured to receive display data on a serial display data signal 62 via serial interface 64 of system ASIC 40 along a serial interface port. Alternatively, memory 66 can be configured to receive data via parallel ports or other communication ports. In second display mode, memory 66 provides data through digital circuit 54 to continually refresh at least a portion of display 12. In one exemplary embodiment, prior to entering a sleep or low power mode, processing circuit 20 shifts into memory 66 display data sufficient to provide a partial display on display 12. Portions of processing circuit 20 then enter a sleep mode, while a portion or a subsystem of display driver 36 continues to refresh display 12 with a sufficient refresh rate to provide a steady image from a user's perspective (e.g., or even to provide a blinking display which dims over time, or even a blinking display separated by a period of no display for several seconds or more). In the first display mode, display refresh rates can be between 50 and 55 Hz, or other display refresh rates. In the second display mode, refresh rates can be 30 Hz or less, or other display refresh rates.

According to another exemplary embodiment, a first display mode can be a display mode in which display 12 is refreshed at a first refresh rate, for example 50 to 70 Hz. Second display mode may also be a display mode in which substantially all of display 12 is refreshed, optionally in full color, but in this exemplary second display mode, the refresh frequency is reduced to a lower refresh rate, such as, less than 50 Hz, less than 20 Hz, etc. In this exemplary embodiment, memory 66 need not be used, and instead, data is continually provided from system ASIC or from a different memory either on driver device 36, or off-chip comprising sufficient data for a full screen display. As another alternative, in this embodiment, power may be removed from any portion or portions of display driver 36. Alternatively, power can be maintained on display driver 36 throughout second mode, wherein power savings is realized from a lower refresh rate of display 12.

According to one embodiment, power supply 48 can be an analog power supply for display 12, configured to provide a main or primary power to display 12 via power line 80 (e.g., power provided to the LCD glass or other electrodes).

According to various alternative embodiments, the components of processing circuit 20 may be on different chips or on a single chip. For example, display driver 36 and processor 20 may be disposed on a single integrated circuit. Microprocessor 38 and system ASIC 40 may be disposed on a single integrated circuit. Display driver 36 and system ASIC 40 may be disposed on a single integrated circuit. Furthermore, switch control signal 82 which is configured to remove power via switch 70 may be provided by system ASIC 40 or a component thereof, such as LCD controller 60, by microprocessor 38, by driver 36 or by another control circuit.

Figure 6:
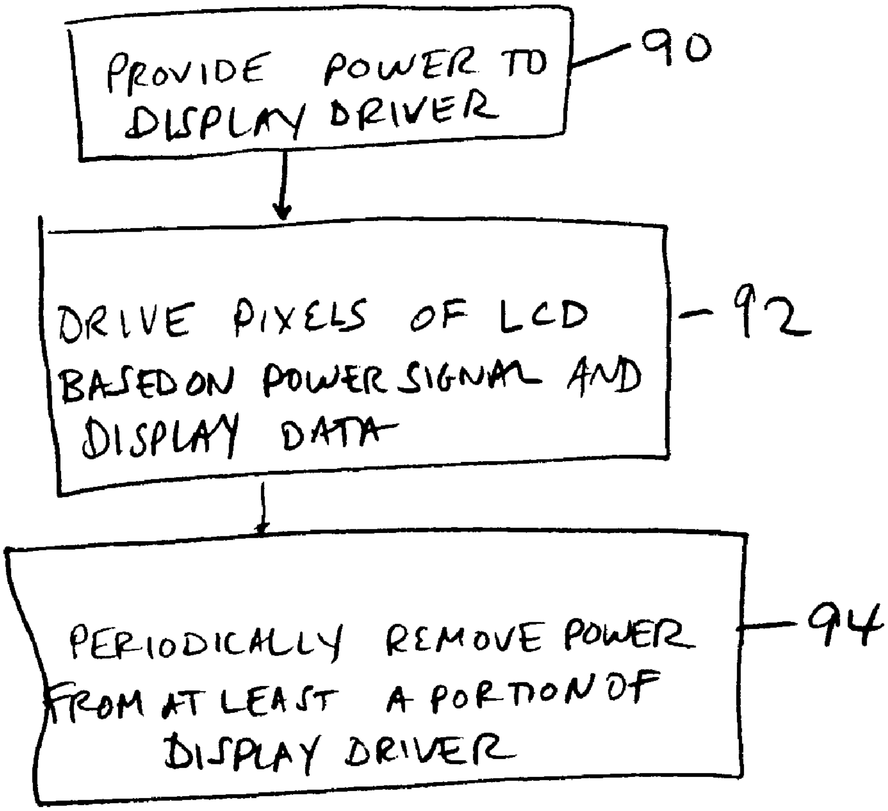
FIG. 6 is a flowchart of a method, according to an exemplary embodiment.

Referring to FIG. 6, an exemplary method is shown for reducing power consumption in mobile computing device 10. At step 90, power is provided to a display driver. At step 92, pixels of display 12 are driven based on the power signal in display data. At step 94, power is periodically removed from at least a portion of the display driver. According to one alternative embodiment, display 12 may be partially refreshed using any the partial refresh characteristics, such as those described above, while the power signal is periodically removed from the display driver.

While the exemplary embodiments illustrated in the Figs., and described above are presently exemplary, it should be understood that these embodiments are offered by way of example only. For example, other display drivers may allow for removing power from different subsystems or portions of the driver to save power. Further, the features disclosed herein may be applied to other electronic devices, such as laptop computers, handheld navigation devices comprising location determination circuitry, etc. Further still, the backlight can be selectively turned on or off, or even pulsed, in any of the different embodiments or modes of embodiments disclosed herein to provide further power savings. Accordingly, the present invention is not limited to a particular embodiment, but extends to various modifications that nevertheless fall within the scope of the appended claims.

What is claimed is:

1. A mobile computing device, comprising:

a power source configured to provide a power signal;

a display comprising a plurality of pixels;

a display driver configured to receive the power signal and to drive the pixels based on the power signal and display data; and a processing circuit configured to periodically remove the power signal from at least a portion of the display driver and to partially refresh the display with the display data and periodically remove the power signal while partially refreshing the display.

2. The mobile computing device of claim 1, wherein the display driver comprises a digital circuit and a power supply circuit, the digital circuit configured to be powered by a digital voltage power supply signal from the power source and the power supply circuit configured to receive the power signal and to provide power to electrodes of the display, wherein the portion of the display driver comprises the power supply circuit.

3. The mobile computing device of claim 1, wherein the display driver and processing circuit are disposed on a single integrated circuit.

4. The mobile computing device of claim 1, wherein the processing circuit is configured to remove the power signal with a period of greater than approximately 0.1 seconds.

5. The mobile computing device of claim 4, wherein the processing circuit is configured to remove the power signal with a period of less than approximately 20 seconds.

6. The mobile computing device of claim 1, wherein the display driver is operable in a first display mode and a second display mode, wherein in the second display mode the display driver refreshes the display with substantially less display data than in the first display mode.

7. The mobile computing device of claim 6, wherein the processing circuit comprises a processor configured to provide the display data to the display driver, wherein in the second display mode the processor enters a low power mode and the display driver refreshes the display using display data stored in a display driver memory.

8. The mobile computing device of claim 7, further comprising a backlight configured to provide light to the display, wherein in the second display mode the backlight is off or dimmed relative to the first display mode.

9. The mobile computing device of claim 6, wherein in the second display mode the display signal represents a black and white image.

10. The mobile computing device of claim 1, wherein the processing circuit comprises a processor configured to provide the display data to the display driver, wherein the display driver is operable in a first display mode and a second display mode, wherein in a second display mode the processor enters a low power mode and the display driver refreshes the display using display data stored in a display driver memory.

11. The mobile computing device of claim 9, further comprising a backlight configured to provide light to the display, wherein in the second display mode the backlight is off or dimmed relative to the first display mode.

12. The mobile computing device of claim 1, wherein the processing circuit is configured to adjust at least one of a duty cycle and a frequency of the power removal based on a criteria.

13. The mobile computing device of claim 12, wherein the criteria comprises a temperature.

14. The mobile computing device of claim 1, wherein the mobile computing device comprises a smart phone.

15. The mobile computing device of claim 1, wherein the display comprises a liquid crystal display.

16. A method of reducing power consumption in a mobile computing device, comprising:

providing a power signal to a display driver;

driving pixels of a display having persistence based on the power signal and display data; and periodically removing the power signal from at least a portion of the display driver, further comprising partially refreshing the display with the display data and periodically removing the power signal while partially refreshing the display.

17. The method of claim 16, further comprising powering a digital circuit portion of the display driver with a digital voltage power supply, wherein the at least a portion of the display driver is a power supply circuit portion, further comprising providing power to electrodes of the display from the power supply circuit portion.

18. The method of claim 17, wherein the power signal is removed with a period of less than approximately 20 seconds.

19. The method of claim 16, wherein partially refreshing comprises reducing a refresh rate of the display.

20. The method of claim 16, wherein partially refreshing comprises switching from displaying a color image to displaying a black and white image.

21. The method of claim 16, wherein the display comprises a liquid crystal display.

22. A mobile computing device, comprising:

means for providing a power signal;

means for displaying an image comprising a plurality of pixels;

means for receiving the power signal and driving the pixels based on the power signal and display data;

means for periodically removing the power signal from at least a portion of the means for receiving the power signal and driving the pixels; and means for partially refreshing the image while the power signal is periodically removed.

23. The mobile computing device of claim 22, wherein the means for periodically removing the power signal removes the power signal with a period of greater than approximately 0.01 seconds and less than approximately 20 seconds.

24. The mobile computing device of claim 22, wherein the mobile computing device comprises a smart phone.

* * * * *